March 3, 1964 W. N. OKAWAKI ETAL 3,123,155
DEPTH GAGING MEANS FOR A V-SHAPED ROW CROP DITCHER
Filed June 30, 1961 2 Sheets-Sheet 1
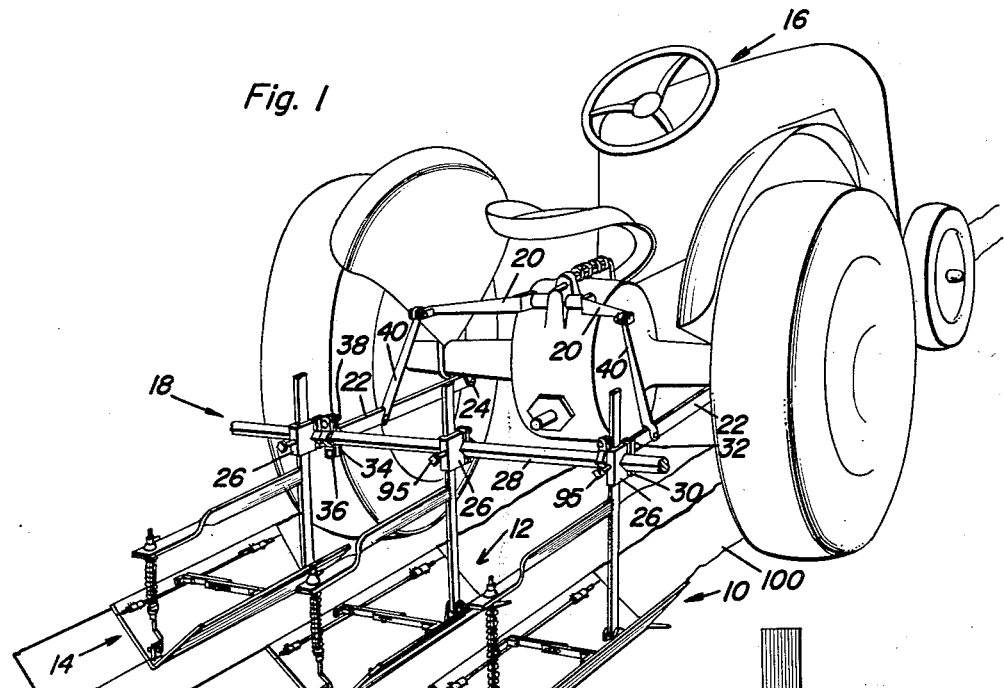
William N. Okawaki
Harry Schmunk
INVENTORS.
BY Clarence A. O'Brien
and Harvey B. Jacobson
Attorneys March 3, 1964   W. N. OKAWAKI ETAL   3,123,155
DEPTH GAGING MEANS FOR A V-SHAPED ROW CROP DITCHER
Filed June 30, 1961   2 Sheets-Sheet 2
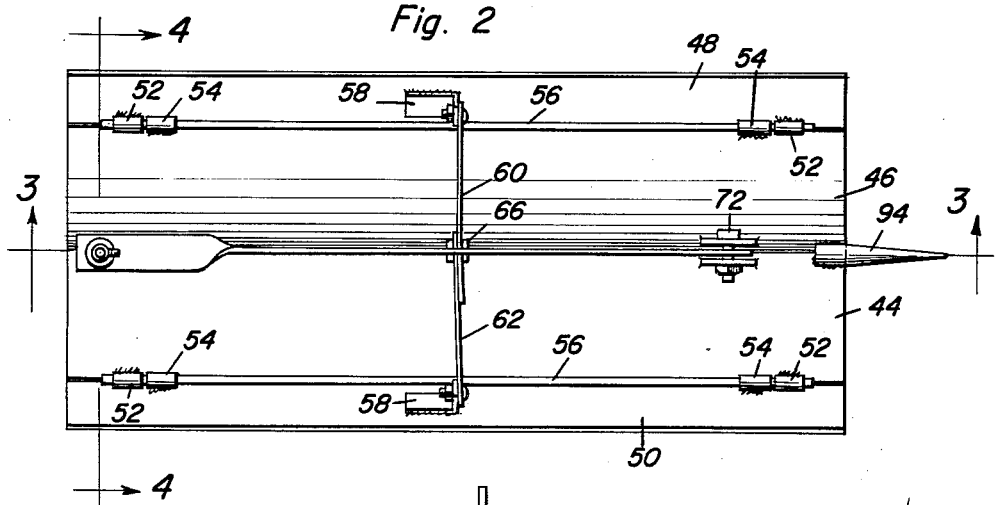
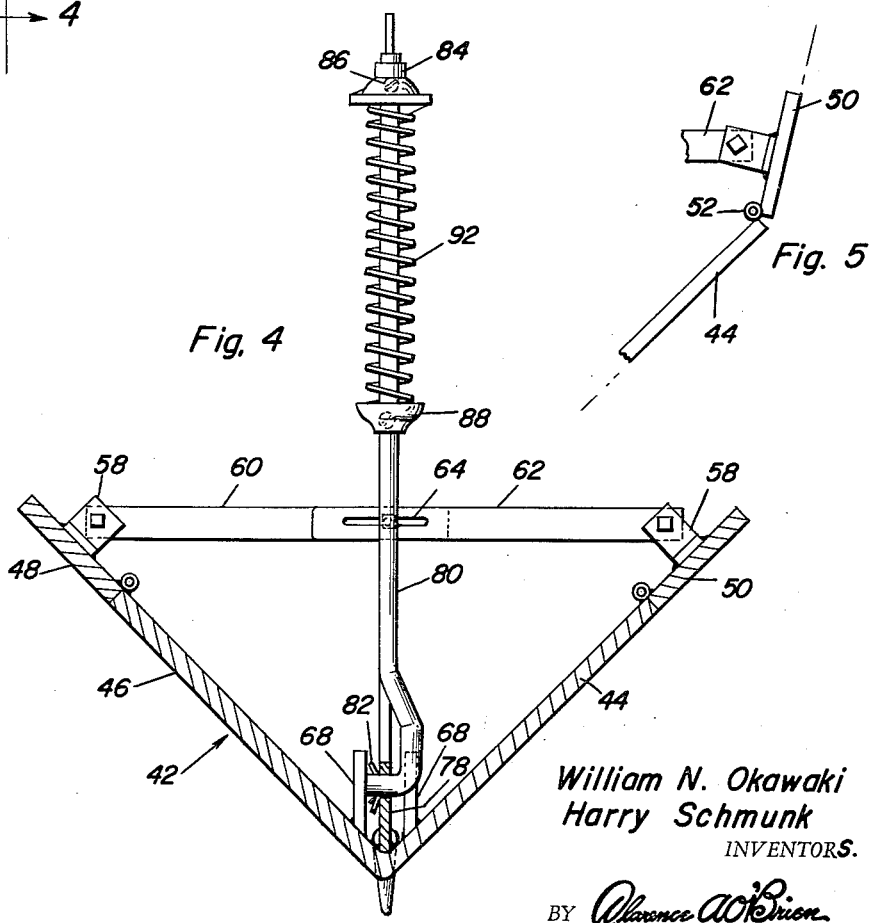
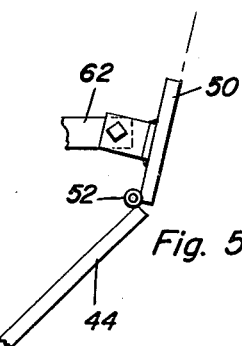
William N. Okawaki
Harry Schmunk
INVENTORS.

United States Patent Office
3,123,155
Patented Mar. 3, 1964

3,123,155
DEPTH GAGING MEANS FOR A V-SHAPED ROW CROP DITCHER
William N. Okawaki, R.F.D. 2, and Harry Schmunk, R.F.D. 1, both of Mitchell, Nebr.
Filed June 30, 1961, Ser. No. 121,155
2 Claims. (Cl. 172—722)

This invention relates to farm machinery and more particularly to a row crop ditcher.

Briefly, the invention comprises a piece of angle iron mounted behind a tractor with its apex pointed downwardly whereby the tractor may drag the angle iron in contact with loosened soil. As the angle iron is dragged through a furrow, it compacts the soil therein downwardly and forms a smooth V-shaped ditch. The angle iron has pivoted wings mounted on each of its upper edges which are normally in alignment with the legs of the angle iron, but may be adjusted inwardly to form a different angle therewith.

It is a primary object of the invention to provide a ditcher of such design that in operation it does not cover small plants growing along the sides of the ditch formed by the ditcher, and the ditcher packs the soil thereby leaving a clean and properly shaped ditch. Other known ditchers leave loose soil, which immediately fills the bottom of the ditch.

It is another object of the invention to provide a ditcher for forming irrigation ditches for vegetables such as beets and beans in such a manner that it will not cover these plants by throwing dirt thereon, but will push or restrictively displace the dirt in a boiling manner.

It is still another object of the invention to provide an irrigation ditcher which will pack the soil properly and not leave any loose ground to slide back into the ditch formed thereby. It thus eliminates a second dragging of the ditcher through the soil to form a single ditch.

It is still another object of the invention to provide a ditcher which fills with dirt during operation whereby its weight is sufficiently increased for properly packing the soil.

It is still another object of the invention to provide a ditcher which has a front chisel angled downwardly for properly loosening the soil and also holding the front end of the ditcher downwardly against the soil.

It is still another object of the invention to provide a ditcher having a spring holddown means and adjustable wings on each side thereof for improving its performance.

It is still another object of the invention to provide a device for towing a plurality of ditching devices whereby numerous ditches may be made with a single pass of the towing vehicle.

It is still another object of the invention to provide a ditching device which is simple in design, economical to manufacture, durable in use and thereby requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing a plurality of row crop ditchers mounted in side-by-side relationship behind a towing tractor;

FIGURE 2 is an enlarged plan view of a single ditcher;

FIGURE 3 is a vertical longitudinal sectional view taken substantially on the plane of line 3—3 of FIGURE 2;

FIGURE 4 is a transverse sectional view taken substantially on the plane of line 4—4 of FIGURE 2; and FIGURE 5 is a rear end view of an upper right portion of a single ditcher.

As shown in FIGURE 1, three separate ditchers 10, 12 and 14 are connected to the rear end of a towing tractor 16 and connected thereto by towing mechanism 18. The tractor 16 is of any conventional design, and the towing mechanism 18 is preferably connected to the power operated lift arms 20 of the tractor.

The towing mechanism 18 comprises arms 22 parallel to each other and having their forward ends pivotally connected at 24 to the underside of the rear axle housing of the tractor.

The rear ends of arms 22 are preferably welded to vertically extending clamp members 34 which have V-shaped grooves therein for receiving a forward edge portion of a rectangular beam 28. A similar clamp 36 lies adjacent the clamp 34 on the opposite side of the beam, and bolts 38 extend through adjacent ends of the clamps for adjustably clamping the beam therebetween. By connecting the arms 22 to the beam 28 in this manner, the beam may be adjusted or removed as desired. The central portions of the arms 22 are pivotally connected to the lower ends of link members 40 whose upper ends are pivotally connected to the rear end of the lift arms 20.

Slidably mounted on beam 28 are a plurality of sleeves 26 having rectangular vertical passages therethrough. These sleeves support hangers 70 and are adjustably connected to beam 28 by clamps 30 and bolts 32 extending through ends of the clamps and threaded into the sleeves.

Preferably, the beam 28 is of sufficient length to have secured thereto at least five and preferably seven or more ditchers. However, since the outer ditchers are all mounted on the beam 28 in a similar manner, and are of identical construction, we have shown only three ditchers connected to the beam 28 for illustrating the principle of the invention.

Since the ditcher assemblies 10, 12 and 14 are of identical construction and design, it is necessary to disclose the detailed construction of only one ditcher. As shown in FIGURES 2 through 5, each ditcher comprises a substantially V-shaped plate or wedge member 42 comprising a conventional angle iron member having right and left legs 44 and 46 respectively which are perpendicular to one another. Each of the legs 44 and 46 is preferably six inches by twenty-four inches by three-eighths inches. Wings 48 and 50 comprising rectangular plates of the length and thickness as the legs 44 and 46 are pivotally connected to these legs by means of tubular sleeves 52 and 54 welded to the wings and legs respectively. There is a set of four tubes 52 and 54 on each side of the ditcher, and each of these sets pivotally receives a hinge rod 56.

Each of the wings 48 and 50 has an angle bracket 58 welded to the center of its inner face. The angle brackets 58 are pivotally and adjustably connected by a pair of overlapping links 60 and 62 which are pivotally connected by bolts to the brackets at their outer ends, and are adjustably connected together at their inner ends by means of overlapping slots 64 receiving an adjustable nut and bolt assembly 66.

The forward central portion of each of the wedges 42 has welded thereto parallel upstanding and spaced lugs 68. A vertically extending shank or hanger 70 has its lower end extending between the lugs 68 and pivotally connected thereto by means of a nut and bolt assembly 72. A cantilevered arm 74 is welded at its forward end to a central portion of the hanger, and the rear portion of the arm 74 is twisted at 76 so as to lie in a horizontal plane.

The rear central portion of the wedge 42 has welded thereto an upstanding lug 78 with a horizontal bore through its upper end. A vertically extending pressure rod 80 has its lower end bent horizontally so as to extend through the aperture in the lug 78 so as to be pivotally connected thereto. A cotter pin 82 extends through a bore in the extreme end portion of the horizontally extending portion of the lower end of the rod for retaining same in engagement with lug 78. The upper end of the rod 80 extends through the bore in the extreme end of arm 74 and has adjustably mounted thereon an annular stop member 84. The stop member is adjustably secured to the rod by means of a setscrew 86. A similar stop member 88 is adjustably secured to the central portion of the rod 80 by means of a setscrew 90. Compressed between the member 88 and the outer end of arm 74 is a compression spring 92.

The forward central portion of the wedge 42 is rigidly secured to a forwardly extending point or spike 94. The front portion of the spike extends downwardly and forms an angle of approximately thirty degrees with the bottom edge of the wedge 42.

The upper end of each hanger 70 slidably extends through the rectangular bore in one of the sleeves 26. Each hanger is respectively adjustably secured to its respective mounting sleeve by means of a setscrew or bolt 95.

In operation, a plurality of ditchers will be adjustably connected to the beam 28. The spacing between the ditchers may be adjusted by loosening the nuts 32 and sliding the sleeves 26 transversely along the beam 28. The vertical elevation of each ditcher is adjusted by loosening bolt 95 and sliding hanger 70 to the desired elevation and then resetting bolt 95. The exact number of ditchers on the beam 28 will depend upon the power of tractor 16, the depth of the ditches to be dug, the adjustment of wings 48 and 50, the density of the soil, etc.

When not in use, the ditchers are elevated to an inoperative position by lifting the power operated lift arms 20 in a conventional manner which in turn lift the ditchers by means of links 40, arms 22, beam 28 and a hanger 70. The depth of the ditches 98 may also be adjusted by the controls for the lift arms 22.

To form the finished ditches 98 in furrows or loosened soil 100, the arms 20 are adjusted so as to locate the forward end of each wedge 42 at the proper or desired elevation. As shown in FIGURE 3, cantilevered arm 74 presses down on compression spring 92 which in turn acts on pressure rod 80 through stop member 88 for forcing the rear end of each wedge 42 downwardly to compact the soil. During the forward movement of each wedge, its respective point or chisel 94 digs into the soil forcing the forward end of the wedge downwardly tightly against the soil. The chisel 94 also tends to cause a small amount of soil to flow into and on top of the wedge whereby after a while it becomes partially filled. The filling of the wedge with soil causes it to become weighted whereby it becomes more effective in packing down the sides of ditch 98.

By adjusting the angular position of wings 48 and 50, the depth and width of the ditch may be effectively regulated. This is quite important since normally there will be vegetables growing between the ditches 98 as they are being formed. Proper adjustment of the wings 48 and 50 will prevent vegetables between the ditches from being covered with dirt during forming of the ditches.

The particular design of the ditchers causes the soil forming the sides of the ditches 98 to be well packed and very smooth. In operation, the ditchers push the dirt aside in a gentle boiling manner, rather than throwing it aside violently as does the conventional ditcher. Accordingly, the ditches so formed are ideally suited as irrigation channels disposed between rows of crops, while the compaction of the soil will destroy and prevent growth of undesired vegetation as a crop cultivation measure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle propelled in a forward direction, an implement for forming a ditch in the loosened soil between parallel rows of growing crops comprising, a pair of flat rectangular soil compacting panels disposed parallel to said forward direction and interconnected to form a substantially sharp edged bottom defining a constant V-shape in cross-section when viewed in said forward direction and operative to restrictively displace soil beneath said panels for compaction thereof, mounting means rigidly secured to said vehicle and operatively connected to the panels for yieldable displacement thereof about axes spaced from open ends of said panels to control the compaction pressure exerted by said panels on the loosened soil substantially independent of any propelling force exerted by the vehicle, a pair of parallel extensions hingedly mounted on upper edges of said panels remote from the bottom, and adjusting means interconnecting said extensions for adjustable positioning thereof inwardly toward each other from positions coplanar with the panels.

2. In combination with a vehicle propelled in a forward direction, an implement for compacting loose soil between parallel rows of growing crops to form a ditch therebetween comprising, upwardly diverging soil compacting means presenting flat surfaces disposed parallel to said forward direction in contact with said loose soil for compaction thereof without displacement from the ditch, means mounting said soil compacting means on the vehicle for exerting a compaction pressure on the loose soil independent of any propelling force exerted by the vehicle, said flat surfaces forming a constant acute angle in all planes perpendicular to said forward direction and surface extension means operatively mounted on said soil compacting means for adjustable displacement from coplanar relation to said flat surfaces to increase the depth of the ditch formed by the implement.

References Cited in the file of this patent

UNITED STATES PATENTS

| 367,457 | Stallings | Aug. 2, 1887 |
| 639,356 | Campbell | Dec. 19, 1899 |
| 1,818,529 | Bockwitz | Aug. 11, 1931 |
| 1,889,486 | McGregor | Nov. 29, 1932 |
| 2,673,511 | Roberts | Mar. 30, 1954 |
| 2,755,722 | Fraga | July 24, 1956 |

FOREIGN PATENTS

| 14,085 | Great Britain | Apr. 23, 1895 |
| 34,801 | Sweden | May 14, 1913 |